United States Patent
Terashima et al.

(10) Patent No.: US 10,080,261 B2
(45) Date of Patent: Sep. 18, 2018

(54) INSULATED STRUCTURE OF INDUCTION HEATING COIL

(75) Inventors: Hidetoshi Terashima, Tokyo (JP); Seiji Ieda, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 12/733,922

(22) PCT Filed: Sep. 26, 2008

(86) PCT No.: PCT/JP2008/067992
§ 371 (c)(1),
(2), (4) Date: May 7, 2010

(87) PCT Pub. No.: WO2009/041729
PCT Pub. Date: Apr. 2, 2009

(65) Prior Publication Data
US 2010/0243644 A1    Sep. 30, 2010

(30) Foreign Application Priority Data

Sep. 27, 2007 (JP) .................................. 2007-251083
Aug. 22, 2008 (JP) .................................. 2008-213937

(51) Int. Cl.
*H05B 6/22* (2006.01)
*H05B 6/36* (2006.01)
(Continued)

(52) U.S. Cl.
CPC ................. *H05B 6/36* (2013.01); *C21D 1/10* (2013.01); *C21D 1/42* (2013.01); *C21D 9/56* (2013.01);
(Continued)

(58) Field of Classification Search
CPC ... H05B 6/36; C21D 1/10; C21D 1/42; C21D 9/56; C21D 9/60; D03D 15/00; D03D 15/12; F27D 11/12; F27D 99/0006
(Continued)

(56) References Cited

U.S. PATENT DOCUMENTS 3,705,253 A * 12/1972 Hicks ............................. 373/130
4,221,672 A *  9/1980 McWilliams ................... 252/62
(Continued)

FOREIGN PATENT DOCUMENTS

EP        57252 A2  *  8/1982
EP    0057252 A2  *  8/1982 ............. H05B 3/748
(Continued)

OTHER PUBLICATIONS

European Search Report dated Apr. 26, 2013, issued in corresponding European Application No. 08833372.9.
(Continued)

*Primary Examiner* — Robert Huber
(74) *Attorney, Agent, or Firm* — Birch, Stewart, Kolasch & Birch, LLP

(57) ABSTRACT

It was learned that in an insulation heating coil used for continuously heating a running steel sheet, the conventional insulated structure of the induction heating coil was selected focusing on the heat resistance and insulation ability of the insulation itself and cannot prevent a drop in insulation ability due to entry of fine metal particles (for example, zinc fumes) in the surroundings.

Therefore, an insulated structure of induction heating coil preventing the entry of zinc fumes and other fine metal particles, not falling in strength even in a high temperature environment, and able to extend the service life of the induction coil is provided.

Specifically, the surface of the induction heating coil is covered with a ceramic cloth made of alumina-silica ceramic
(Continued)

long-fibers not containing boron and the surface of that is formed with a heat-resistant insulation layer made of a surface hardening ceramic material containing alumina or alumina-silica fine particles and alumina-silica ceramic short-fibers.

8 Claims, 3 Drawing Sheets

(51) Int. Cl.
     *C21D 1/42*    (2006.01)
     *C21D 9/60*    (2006.01)
     *C21D 1/10*    (2006.01)
     *C21D 9/56*    (2006.01)
     *D03D 15/00*    (2006.01)
     *D03D 15/12*    (2006.01)
     *F27D 11/12*    (2006.01)
     *F27D 99/00*    (2010.01)
     *C21D 9/46*    (2006.01)

(52) U.S. Cl.
     CPC ............... *C21D 9/60* (2013.01); *D03D 15/00* (2013.01); *D03D 15/12* (2013.01); *F27D 11/12* (2013.01); *F27D 99/0006* (2013.01); *C21D 9/46* (2013.01); *D10B 2101/08* (2013.01); *D10B 2505/00* (2013.01); *F27D 2099/0015* (2013.01); *Y02P 10/253* (2015.11)

(58) Field of Classification Search
     USPC ......................................................... 219/645
     See application file for complete search history.

(56) References Cited

U.S. PATENT DOCUMENTS

| 5,416,795 | A | * | 5/1995 | Kaniuk et al. ................ 373/155 |
| 5,895,599 | A | | 4/1999 | Nivoche |
| 6,114,675 | A | * | 9/2000 | Wada et al. .................... 219/645 |
| 2002/0168554 | A1 | * | 11/2002 | Matsui .................. C04B 41/009 |
| | | | | 428/699 |

FOREIGN PATENT DOCUMENTS

| EP | 0822733 | | 2/1998 |
| JP | 50-27646 | | 8/1975 |
| JP | 53-32550 | | 9/1978 |
| JP | 54-60334 | | 4/1979 |
| JP | 63-99795 | | 6/1988 |
| JP | 1-66786 | | 4/1989 |
| JP | 5-335068 | | 12/1993 |
| JP | 8-8051 | | 1/1996 |
| JP | 8-288057 | | 11/1996 |
| JP | 2005-156124 | | 6/2005 |
| JP | 2005221132 A | * | 8/2005 |
| JP | 2006-169603 | | 6/2006 |
| JP | 2008-60026 | | 3/2008 |

OTHER PUBLICATIONS

International Search Report dated Dec. 22, 2008 issued in corresponding PCT Application No. PCT/JP2008/067992.

\* cited by examiner

INSULATED STRUCTURE OF INDUCTION HEATING COIL

This application is a national stage application of International Application No. PCT/JP2008/067992, filed 26 Sep. 2008, which claims priority to Japanese Application Nos. 2007-251083, filed 27 Sep. 2007; and 2008-213937, filed 22 Aug. 2008, each of which is incorporated by reference in its entirety.

TECHNICAL FIELD

The present invention relates to an insulated structure of an induction heating coil used for continuous heating of a running steel sheet.

BACKGROUND ART

The continuous annealing furnace of a steel sheet, the alloying furnace of a plating facility for steel sheet, and other steel sheet production facilities use induction heating coils for rapidly heating the steel sheets. Such an induction heating coil is made a tubular coil conductor provided with a steel sheet passage inside it (solenoid type), a coil conductor set so as to sandwich the sheet from above and below (traverse type), etc. to enable uniform heating of the steel sheet from the front and back surfaces and is covered on its surface with an insulating material having heat resistance.

As the insulating material for this, in the past, a heat insulating castable refractory or alumina cloth or other alumina ceramic such as high temperature heat-resistant fibers etc. has been used.

Japanese Patent Publication (A) No. 2005-156124 (JP2005-156124 A), unlike the present invention, relates to an induction heating coil of a hot forged material and discloses an insulated structure made of monolithic refractory containing a porous flame resistant aggregate and covering the inside surface of the induction heating coil.

Japanese Patent Publication (A) No. 2006-169603 (JP2006-169603 A) discloses an induction heating coil for the same application of the present invention insulated by an alumina ceramic. However, it does not describe details of the alumina ceramic.

Such a conventional insulated structure of an induction heating coil was selected focusing solely on the heat resistance and insulation ability. It was learned that it was not possible to prevent a drop in insulation due to entry of fine metal particles in the atmosphere (for example, zinc fumes).

In the galvanization line of steel sheet, fine zinc fumes float in the atmosphere in the furnace, so if continuously operating this over a long period, the electromagnetic force causes the zinc fumes to be drawn to and deposit on the insulated surface of the induction heating coil. It was learned that part of this deposits and builds up between the particles, in the cracks, etc. of the insulating material, passes through the insulating material along the cracks, and short circuits the coil surface and the shield plate grounded with the coil or between the coils.

Note that surfaces of the coil wires may also be coated in advance with a varnish, enamel, or other insulating coating. Further, if the temperature inside the furnace exceeds 450° C., these insulating coatings are burned off and the surfaces of the copper wires end up being exposed. For this reason, if zinc fumes enter, it is not possible to prevent a drop in insulation of the induction heating coil.

If such a drop in insulation occurs at the induction heating coil, line stoppages will be invited and serious losses will occur. For this reason, solution of this problem is being strongly sought. Further, to avoid such trouble, it has been necessary to conduct periodic inspections to determine the state of deterioration of the insulation and make repairs.

DISCLOSURE OF THE INVENTION

An object of the present invention is to solve the above conventional problem and provide an insulated structure of an induction heating coil continuously heating a running steel sheet which maintains insulation characteristics equal to or better than at the start under continuous usage conditions of a high temperature of several hundred degrees centigrade and further prevents a drop in insulation due to zinc fumes and other fine metal particles and thereby extends the service life of the induction heating coil.

The aspect of the invention of the present claim 1, made so as to solve the above problem, is an induction heating coil for induction heating of steel sheet characterized by covering the surface on the side facing the steel sheet by a ceramic cloth and forming a heat-resistant insulation layer made of a surface hardening ceramic material containing ceramic short-fibers on one or both of an induction coil side or a steel sheet side of the ceramic cloth.

Note that as set forth in claim 2, the induction heating coil may be made a solenoid type.

As set forth in claim 3, preferably the ceramic cloth is made of silica or alumina-silica ceramic long-fibers not containing boron.

As set forth in claim 4, preferably the surface hardening ceramic material includes alumina or alumina-silica fine particles, alumina-silica ceramic short-fibers, colloidal silica, and an organic binder.

As set forth in claim 5, preferably the ceramic short-fibers are obtained by fiberized from a ceramic fiber bulk.

As set forth in claim 6, preferably the surface hardening ceramic material is spray coated on the surface of the ceramic cloth to form a heat-resistant insulation layer.

Further, as set forth in claim 7, the induction heating coil can be installed in a continuous annealing furnace of steel sheet or an alloying furnace of a plating facility.

Next, the advantageous effect of the present invention will be explained.

According to the insulated structure of induction heating coil of the present invention, the surface of the side of the induction heating coil facing the steel sheet is covered by ceramic cloth and the induction coil side and/or steel sheet side of the ceramic cloth is formed with a heat-resistant insulation layer made of a surface hardening ceramic material containing ceramic short-fibers.

If just insulating the coil surface by ceramic cloth, fine metal particles can pass through the mesh parts and enter the inside. Further, if employing the structure of the present invention, the ceramic short-fibers contained in the surface hardening ceramic material become entangled in the mesh and the ceramic particles deposit on the ceramic short-fibers and completely seal in the fine metal particles. For this reason, even if zinc fumes and other fine metal particles deposit on the surface, they will not be able to pass through the insulating material layer and will never reach the coil surface. Therefore, they will not cause a drop in insulation of the induction heating coil like in the past.

The heat-resistant insulation layer of the present invention is comprised of a ceramic cloth superior in heat resistance and insulation ability and a surface hardening ceramic material including ceramic short-fibers, so can exhibit stable heat resistance and insulation ability over a long period of time even under high temperature conditions of 500° C. to 1200° C.

As a result, it is possible to eliminate line stoppages due to drop in insulation of the induction heating coil.

As set forth in claim 2, when the induction heating coil for the induction heating of the steel sheet is a solenoid type, it is sufficient to make at least just the inner circumference facing the steel sheet this structure. This is because the zinc fumes and other fine metal particles are present inside the furnace through which the steel sheet is run. Needless to say both the inner and outer circumferences of the induction heating coil may also be covered by this heat-resistant insulation layer.

As set forth in claim 3, if making the ceramic cloth from silica or alumina-silica ceramic long-fibers not containing boron, at the time of heating, boron will not elute and diffuse to and permeate the inside of the surrounding ceramic cloth and cause deterioration, and stable heat resistance and insulation ability can be exhibited. The practical heat-resistant temperature of these ceramic cloths is, with silica, 800° C. or more, and, with alumina-silica, 1000° C. or more. They can also be used for a high temperature induction heating apparatus able to heat to 800° C. or more.

As set forth in claim 4, if the surface hardening ceramic material is one including alumina or alumina-silica fine particles, alumina-silica ceramic short-fibers, and colloidal silica, it is possible to exhibit stable heat resistance and insulation ability. On top of this, since ceramic particles and ceramic short-fibers are the same in material, the adhesiveness between them is good and it is possible to enhance the effect of prevention of passage of fine metal particles.

As set forth in claim 5, if the ceramic short-fibers are obtained by fiberized from a ceramic fiber bulk, it is possible to lower the production costs.

As set forth in claim 6, if spraying the surface hardening ceramic material on to the surface of the ceramic cloth to coat it, the coating work efficiency is good and a broad area can be coated with a uniform thickness.

As set forth in claim 7, if placing the induction heating coil for induction heating of a steel sheet in a continuous annealing furnace of steel sheet or an alloying furnace of a plating facility, it is possible to improve the stability of the continuous annealing line or alloy plating line.

BEST MODE FOR CARRYING OUT THE INVENTION

Below, a preferable embodiment of the present invention will be shown.

Figure 1:
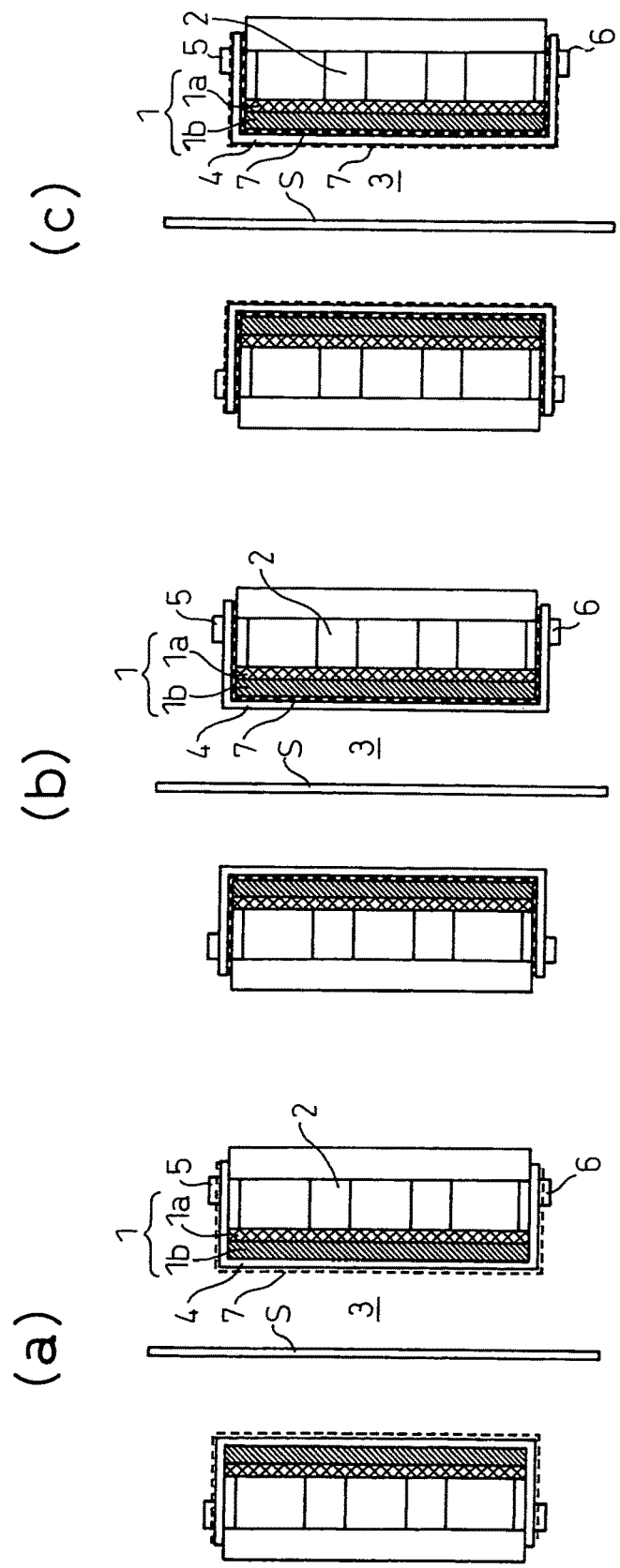
FIGS. 1(a), (b), (c) are center cross-sectional views of an induction heating coil in the present embodiment.

FIGS. 1(a), (b), (c) are center cross-sectional views of an induction heating coil 1 in examples of the present embodiment. FIG. 1(a) shows the case of a ceramic cloth 4 on the steel sheet side of which a heat-resistant insulation layer made of a surface hardening ceramic material 7 including ceramic short-fibers is formed. FIG. 1(b) shows the case of a ceramic cloth 4 on the coil side of which a heat-resistant insulation layer made of a surface hardening ceramic material 7 is formed. FIG. 1(c) shows the case of a ceramic cloth 4 on both the steel sheet side and coil side of which heat-resistant insulation layers made of a surface hardening ceramic material 7 are formed.

The induction heating coil 1 is comprised of a coil conductor 1a and a coil frame 1b and is supported by a base 2. In these embodiments, the induction heating coil 1 is a solenoid type provided at its center with a steel sheet passage 3 through which a steel sheet S passes vertically. Further, this may also be placed horizontally to enable horizontal sheet passage.

FIG. 1(a) will be used to explain the present invention. The surface of the side of this induction heating coil 1 facing the steel sheet S, that is, the surface near the steel sheet passage 3, is covered by a heat-resistant insulation layer comprised of a ceramic cloth 4 and surface hardening ceramic material 7. That is, at the surface of the induction heating coil 1 near the steel sheet passage 3, the ceramic cloth 4 is fastened by fasteners 5 and 6. The center part of this ceramic cloth 4 is preferably bonded to the coil frame 1b using a sealant. Further, the surface of this ceramic cloth 4 is sprayed with a surface hardening ceramic material 7 to be coated to a uniform thickness.

Ceramic cloth 4 has conventionally been used for insulating induction heating coils. There are silica and alumina-silica types. As the silica type, for example, there is the N-Silica Fiber (maximum heat-resistant temperature 1000° C.) made by Nihon Glass Fiber Industrial Co., Ltd. As the alumina-silica type, for example, there is TOMBO No. 8350 Rubilon made by Nichias.

Furthermore, for the ceramic cloth, a woven fabric of alumina-silica ceramic long-fibers superior in heat resistance and insulation ability is preferably used. Most preferable from the viewpoint of the heat resistance is a composition of alumina in 70 to 80% and silica in 30 to 20%. Note that this composition preferably does not include any boron. This is because boron elutes at a high temperature and is liable to cause the ceramic fibers to degrade.

Here, the "long-fibers" are comprised of extremely fine ceramic fibers mainly made of alumina, silica, etc. and having a diameter of several μm to 10 μm or so twisted together. For example, it indicates ceramic fibers, in the case of alumina, of 5 to 10 cm in length or, in the case of silica, of 50 cm or more in length, able to be woven to obtain a ceramic cloth.

There are various ways to weave the ceramic cloth 4 such as a plain weave, twill weave, satin weave, etc., but in the present invention, no difference in action or effect due to the weaving method can be recognized, so any weaving method may be used. Further, the thickness may be 0.3 to 1.2 mm or so. As such an alumina-silica ceramic cloth, for example, the ultrahigh temperature heat-resistant fibers commercially available from Nihon Glass Fiber Industrial Co., Ltd. under the name of "Alumina Seven" (maximum heat-resistant temperature: 1200° C.) may be used.

Further, as explained above, with just the ceramic cloth 4, passage by fine metal particles cannot be reliably prevented, so in the present invention, the surface is coated with a surface hardening ceramic material 7 including ceramic short-fibers. This surface hardening ceramic material 7, for example, includes alumina or alumina-silica fine particles, alumina-silica ceramic short-fibers, colloidal silica, and an organic binder.

The "alumina-silica composition" means one containing alumina in a mass % of 40 to 95% and silica in 60 to 5%. The fine particles have a size of a circle equivalent diameter of 0.1 to 50 μm or so. As the ceramic short-fibers, ones having a diameter of several μm to 10 μm or so and a length of several μm to 500 μm or so obtained by fiberized from a bulk are preferably used.

Furthermore, the "bulk" means the wadding shaped product after removal of spherical particles (generally called "shot") not used for forming fibers in the process of forming fibers by melt processing of the alumina, silica, and other materials. Further, as an organic binder, a cellulose-based glue may be used.

As such a surface hardening ceramic material 7, for example, the one commercially available from Shinnikka Thermal Ceramics Corporation under the name "Thermopreg" may be used. This surface hardening ceramic material 7 is a product aimed at hardening the surface of the ceramic fibers and preventing flying fibers and is provided with a heat resistance of a maximum usage temperature reaching 1400° C.

Figure 2:
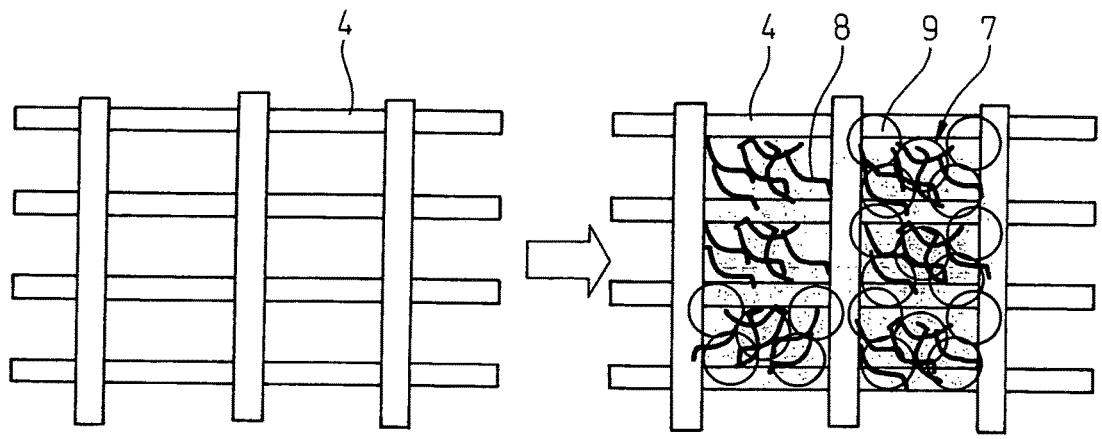
FIG. 2 is an explanatory view showing the state of sealing a mesh of ceramic cloth by ceramic short-fibers and ceramic particles.

If coating the surface of the ceramic cloth 4 with such a surface hardening ceramic material 7, as shown in FIG. 2, the ceramic short-fibers 8 entangle with the mesh of the ceramic cloth 4. Furthermore, the ceramic particles 9 also deposit on this to reliably plug the mesh of the ceramic cloth 4. These are all the same materials, so the adhesiveness is also good. Therefore, after curing for hardening, entry of zinc fumes and other fine metal particles can be completely prevented. Note that this coating can be performed by spraying by a spray gun, so even when the induction heating coil 1 is tubular, easy coating to the inside becomes possible.

The surface hardening ceramic material 7 has the same effect whether, as shown in FIGS. 1(a), (b), and (c), coated on the steel sheet side of the ceramic cloth 4 or the induction coil side of the ceramic cloth 4. Either may be selected depending on the convenience for installation. It is more preferable to coat this on both the induction coil side and steel sheet side needless to say.

However, when coating the surface hardening ceramic material 7 on the steel sheet side of the ceramic cloth 4, to prevent detachment of the surface hardening ceramic material 7 due to contact with the steel sheet due to some sort of trouble, it is preferable to cover this with a ceramic or other heat-resistant board or sheet.

Similarly, even when the induction heating coil is set horizontally, it is preferable to take similar measures to prevent detachment of the surface hardening ceramic material 7 coated on the steel sheet side of the ceramic cloth 4 at the top side of the steel sheet.

Furthermore, in addition to these insulated structures, the conventionally used high temperature heat-resistant coatings (for example "Pyrocoat" made by Otake Ceram etc.) or ceramic binders (for example "Thermodyne" made by Shinnikka Thermal Ceramics Corporation etc.) may also be coated between the coil conductor 1b and surface hardening ceramic material 7, the top surface of the surface hardening ceramic material 7 of the surface-most layer, or the top surface of the ceramic cloth of the surface-most layer.

As explained above, according to the insulated structure of an induction heating coil of the present invention, it is possible to completely cover the surface of the induction heating coil 1 facing the steel sheet passage 3 by the ceramic cloth 4 and surface hardening ceramic material 7 and insulate and protect the induction heating coil under conditions of a usage temperature of several hundred to 400° C. Furthermore, it is possible to completely prevent the entry of zinc fumes and other floating fine metal particles into the steel sheet passage 3 and prevent a drop in the insulation ability. For this reason, it is possible to reliably prevent line stoppages due to a drop in insulation of the induction heating coil 1.

Figure 4:
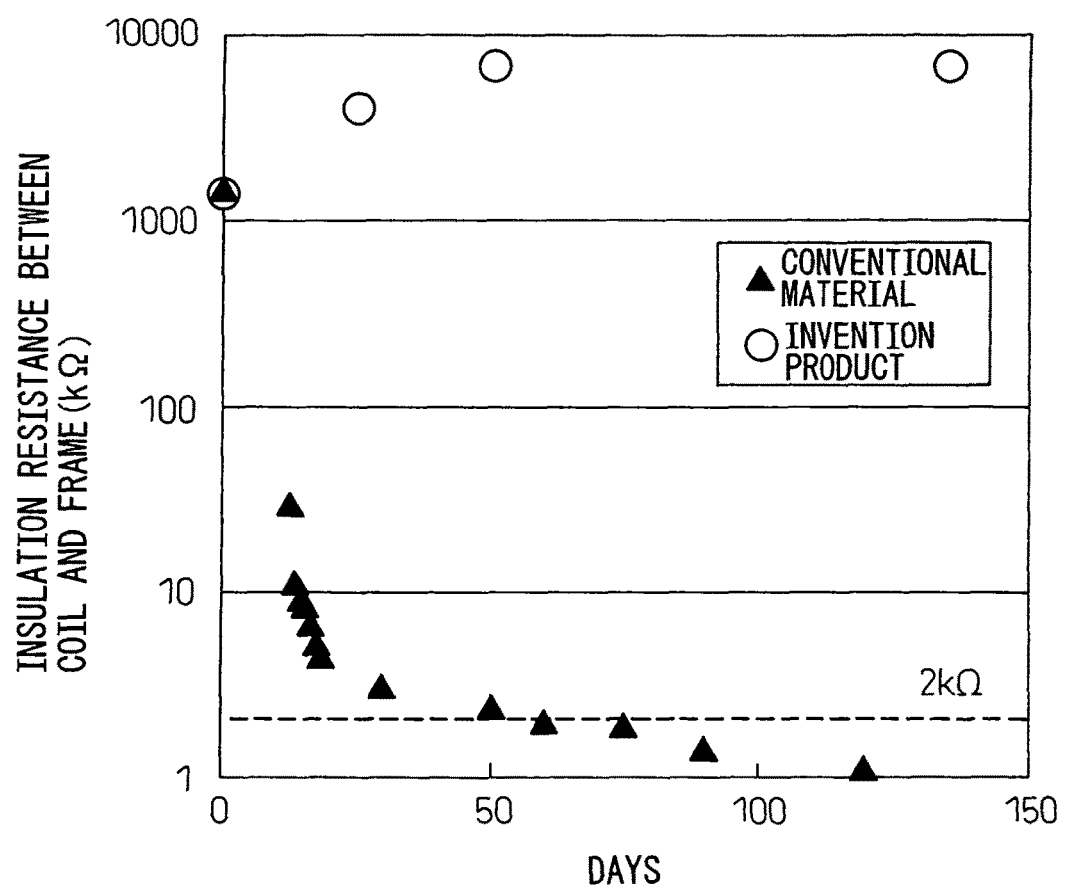
FIG. 4 is a comparative view of the state of insulation between the coil and frame of the present invention and a prior art product at 400° C.

When employing the present invention for an actual line, as shown in FIG. 4, it was confirmed that the induction heating coil according to the present invention maintained an insulation resistance of 7 MΩ even after 3 months after installation.

On the other hand, an induction heating coil covered with only a conventional ceramic cloth fell below an insulation resistance of 2 kΩ about 2 months after installation. The deterioration in insulation was remarkable.

The following experiments were performed to confirm the advantageous effects of the insulated structure of the present invention explained above.

Experiment 1: Coatability Test

The surface hardening ceramic material "Thermopreg" used in the present invention and the ceramic binder "Thermodyne" of the same chemical composition, but not containing any short-fibers were used to compare the coating performances on cooled copper sheet and alumina cloth (the above-mentioned "Alumina Seven"). Note that "Thermodyne" is a product of Shinnikka Thermal Ceramics Corporation the same as "Thermopreg". Both have chemical compositions of alumina+silica of 95% or more and maximum usage temperatures of 1400° C.

The surfaces of 100 mm×100 mm water-cooled copper sheets were coated with "Thermopreg" and "Thermodyne" by brushing to thicknesses of about 1.5 mm and cured to prepare two types of test pieces. These test pieces were placed in an electric furnace held at 650° C. and heated for 20 minutes while being cooled by running 3 liter/min of cooling water, then were forced cooled indoors for 20 minutes. This operation was repeated five times then the state of occurrence of cracks and detachment at the surface of the test pieces was confirmed visually.

As a result, the test piece where "Thermodyne" was coated on the surface of the water-cooled copper sheet already suffered from numerous fine cracks at the stage of the end of curing and suffered from partial blistering and peeling due to the first heating and cooling.

As opposed to this, the test piece where "Thermopreg" was coated on the surface of the water-cooled copper sheet had no cracks or peeling at all at the stage of the end of curing and did not exhibit any cracks or peeling even after five repeated heating and cooling operations.

Next, the surfaces of alumina cloths were coated by brushing with "Thermopreg" and "Thermodyne" to thicknesses of about 1.5 mm and cured to prepare two types of test pieces. These test pieces were placed in an electric furnace held at 650° C. and heated for 20 minutes, then were forced cooled indoors for 20 minutes. This operation was repeated five times. The state of occurrence of cracks and detachment was visually checked.

As a result, the test piece where "Thermodyne" was coated on the surface of the alumina cloth already suffered from numerous fine cracks at the stage of the end of curing and suffered from partial blistering due to the first heating and cooling. As opposed to this, the test piece where "Thermopreg" was coated had no cracks or peeling at all at the stage of the end of curing of course and even after five repeated heating and cooling operations.

As a result of the coatability test, "Thermopreg" containing short-fibers was good in adhesiveness both with copper sheet and with alumina cloth and furthermore did not allow cracks or peeling even with repeated heating and cooling, so the entry of zinc fumes and other fine metal particles can be effectively prevented.

Experiment 2: Withstand Voltage Test

As test pieces for the withstand voltage test, four types were prepared: copper sheets coated on their surfaces with only "Thermopreg", copper sheets covered on their surfaces with alumina cloth and "Thermopreg", copper sheets coated on their surfaces with only "Thermodyne", and copper sheets covered on their surfaces with alumina cloth and "Thermodyne".

Figure 3:
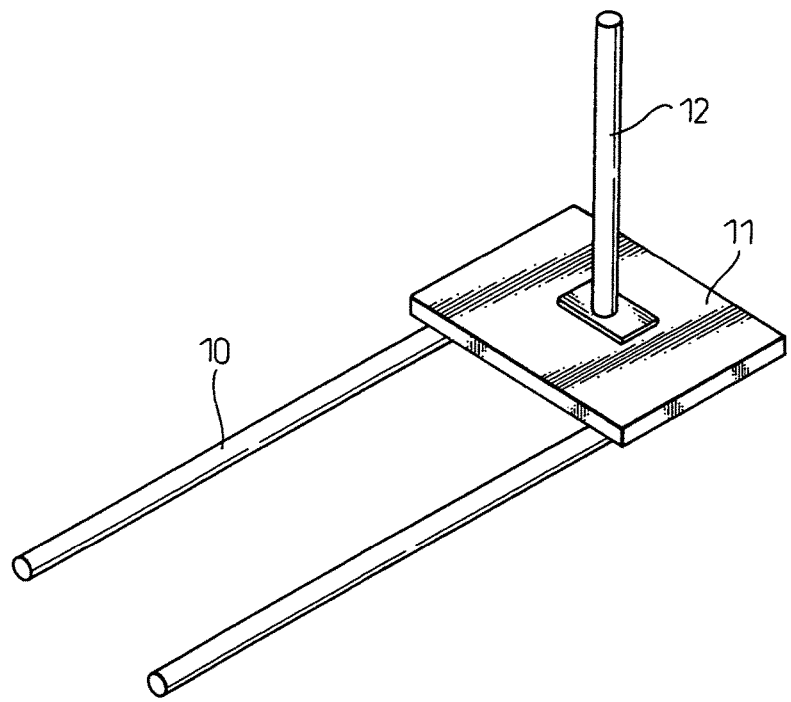
FIG. 3 is an explanatory view of a device used for the withstand voltage test.

One of each of the four types of the test pieces was selected, as shown in FIG. 3, the test piece 11 was attached to the front end of the voltage electrode 10, a ground electrode 12 made of a copper sheet was brought into contact with its surface, and current flowing to the ground electrode 12 was detected while gradually raising the AC voltage applied to the voltage electrode 10 so as to test the withstand voltage performance of the four types of test pieces 11. The power source was the commercial power supply. This was boosted to 2000V for use. Note that the test conditions were a temperature of 24° C. and a humidity of 52%.

As a result, the test piece where only "Thermopreg" was coated on the surface of the copper sheet rapidly rose in charging current near 1000V and suffered from insulation breakdown. Further, the invention product with alumina cloth and "Thermopreg" covered on the surface of the copper sheet had a charging current of about 7 mA even when boosted to 2000V, had a stable current value during the test, and exhibited a sufficient withstand voltage characteristic. As opposed to this, the test piece with only "Thermodyne" coated on the surface of the copper sheet suffered from insulation breakdown at 1300V.

Further, the test piece with alumina cloth and "Thermodyne" covered on the surface of the copper sheet had a charging current when boosted to 2000V of about 20 mA and a current value during the test fluctuating in the range of 4 to 17 mA or somewhat unstable.

Note that the resistance values at 1000V were, in the above order, 10 MΩ, 13%Ω, 27 MΩ, and 40 MΩ. From the results, from the overall perspective, the best withstand voltage characteristic was exhibited by the combination of an alumina cloth and "Thermopreg".

Experiment 3: Withstand Voltage Test in Presence of Zinc Fumes

To approach an actually repaired insulated structure of an induction heating coil, alumina cloth coated with "Thermodyne" and alumina cloth coated with "Thermopreg" were stacked in two layers and tested for withstand voltage by a method similar to the above, whereby the charging current was 8.3 mA even at 2700V or a good withstand voltage characteristic was exhibited. Note that the test conditions were a temperature of 26° C. and a humidity of 4.6%.

Therefore, the voltage was similarly boosted to 2700V in the state with zinc fumes scattered over the top surface of the test piece, whereby the charging current rose to 12 mA, but it was confirmed there were no unstable points even during the test and superior withstand voltage characteristics were exhibited even in the presence of zinc fumes.

The silica, boron-containing alumina-silica, boron-free alumina-silica ceramic cloths applying the present invention were adhered to water-cooled copper sheets of a grade similar to the induction coil and were further coated with Thermopreg, heated at 500 to 1200° C.×72 Hr, and evaluated for insulation ability and strength. The results are shown in Table 1.

Furthermore, the insulation was evaluated by an apparatus similar to the above Experiment 2. When the commercial power supply was boosted to 2000V and a high voltage was applied and the charging voltage was 7 mA or so or the withstand voltage characteristic was good, the insulation was evaluated as "Good", while when the withstand voltage characteristic was poor and insulation breakdown occurred, it was evaluated as "Poor" as shown in Table 1. Further, the strength was evaluated by observing whether the ceramic cloths attached to the water-cooled copper sheets sagged during high temperature treatment or other problems occurred. When the state could be maintained, the strength was evaluated as "Good" and when the state could not be maintained, the strength was evaluated as "Poor" in Table 1.

TABLE 1

| Temperature condition | Silica + Thermopreg | | Boron-containing alumina-silica + Thermopreg | | Boron-free alumina-silica + Thermopreg | |
| --- | --- | --- | --- | --- | --- | --- |
| | Insulation evaluation | Strength evaluation | Insulation evaluation | Strength evaluation | Insulation evaluation | Strength evaluation |
| 500° C. × 72 Hr | Good. | Good | Good | Good | Good | Good |
| 600° C. × 72 Hr | Good | Good | Good | Good | Good | Good |
| 800° C. × 72 Hr | Good | Poor | Good | Good | Good | Good |
| 1000° C. × 72 Hr | Poor | Poor | Good | Poor | Good | Good |
| 1200° C. × 72 Hr | Poor | Poor | Good | Poor | Good | Good |

From Table 1, each material exhibited a good insulation ability and strength up to 600° C. Further, silica exhibited a drop in strength a 800° C. and insulation breakage at 1000° C. Boron-containing alumina-silica also exhibited a drop in strength at 1000° C. On the other hand, even in boron-free alumina-silica, it was confirmed that there was no drop in strength and a good insulation ability was maintained even at 1200° C.

INDUSTRIAL APPLICABILITY

By employing the insulated structure according to the present invention for an induction heating coil, it is possible to maintain insulation characteristics equal to or better than at the start and prevent a drop in insulation due to the entry of zinc fumes and other fine metal particles even under continuous usage conditions of a high temperature of hundreds of degrees centigrade. As a result, it is possible to extend the service life of the induction heating coil.

Due to this, stable operation of the facility is realized and stoppage of the facility due to trouble or inspections can be avoided, so it is possible to greatly contribute to improvement of the productivity.

Further, needless to say, the invention is not limited to steel sheet. By applying the present invention to an induction heat coil of other metal materials, similar effects can be expected. This is technology able to be applied to not only the ferrous metal industry, but the broader industrial world and has much to contribute to.

The invention claimed is:

1. An insulated structure of an induction heating coil comprised of a coil conductor and a coil frame for induction heating of a steel sheet passing vertically characterized by
arranging a ceramic cloth directly covering a surface of the induction heating coil on a side of the induction heating coil facing the steel sheet, wherein one of (i) the ceramic cloth is fastened by fasteners to at least one of the coil frame and a base supporting the induction heating coil, or (ii) the ceramic cloth is bonded to the coil conductor or the coil frame by a sealant,
wherein the ceramic cloth forms an electrical insulation layer and has a surface hardening ceramic material containing ceramic short-fibers, ceramic particles disposed on the ceramic short-fibers, colloidal silica and an organic binder formed on at least a steel sheet side of the ceramic cloth and an induction heating coil side of the ceramic cloth,
wherein the ceramic short-fibers are made of alumina-silica with a diameter of 3 μm to 10 μm and a length of 3 μm to 500 μm, and the ceramic particles are made of alumina or alumina-silica with a circle equivalent diameter of 0.1 to 50 μm,
wherein the ceramic short-fibers contained in the surface hardening ceramic material are entangled in the mesh and the ceramic particles deposit on the ceramic short-fibers,
wherein the ceramic cloth is a boron-free alumina-silica ceramic cloth and the thickness of the ceramic cloth is 0.3 to 1.2 mm,
wherein the surface of the ceramic cloth facing the steel sheet is capable of reaching temperature between 1000° C. and 1200° C., and
wherein the coil frame, a base supporting the induction heating coil, or the coil conductor on which the ceramic cloth attaches is water-cooled.

2. An insulated structure of induction heating coil as set forth in claim 1, characterized in that said induction heating coil is a solenoid type.

3. An insulated structure of induction heating coil as set forth in claim 1, characterized in that said ceramic cloth is made of silica or alumina-silica ceramic long-fibers not containing boron.

4. An insulated structure of induction heating coil as set forth in claim 1, characterized in that said ceramic short-fibers are obtained by fiberized from a ceramic fiber bulk.

5. An insulated structure of induction heating coil as set forth in claim 1, characterized in that said surface hardening ceramic material is spray coated on the surface of the ceramic cloth to form a heat-resistant insulation layer.

6. An insulated structure of induction heating coil as set forth in claim 5, characterized in that said surface hardening ceramic material is coated to a uniform thickness.

7. An insulated structure of induction heating coil as set forth in claim 1, characterized in that when the surface hardening ceramic material is coated on the steel sheet side of the ceramic cloth, a heat-resistance board or sheet is arranged on the surface hardening ceramic material.

8. An insulated structure of induction heating coil as set forth in claim 1, characterized in that the ceramic cloth is a woven fabric of a long-fibers, wherein the long-fibers are comprised of ceramic fibers with a diameter of 10 μm or less and with a length of 5 to 10 cm in the case of alumina or of 50 cm or more in the case of silica.

* * * * *